(12) United States Patent
Minemura et al.

(10) Patent No.: US 8,220,848 B2
(45) Date of Patent: Jul. 17, 2012

(54) COVER MEMBER ATTACHING STRUCTURE

(75) Inventors: Ryuji Minemura, Kanagawa (JP); Kousuke Kakita, Kanagawa (JP)

(73) Assignee: Alpha Corporation, Yokohoma-Shi (JP)

( * ) Notice: Subject to any disclaimer, the term of this patent is extended or adjusted under 35 U.S.C. 154(b) by 51 days.

(21) Appl. No.: 10/829,999

(22) Filed: Apr. 23, 2004

(65) Prior Publication Data

US 2004/0212215 A1   Oct. 28, 2004

(30) Foreign Application Priority Data

Apr. 25, 2003 (JP) ................................. 2003-122308

(51) Int. Cl.
*E05B 1/00* (2006.01)

(52) U.S. Cl. ................... 292/347; 292/336.3; 296/146.7

(58) Field of Classification Search ................. 292/347, 292/352, 336.3, 337; 296/37.13, 149, 146.7
See application file for complete search history.

(56) References Cited

U.S. PATENT DOCUMENTS

| | | | | |
|---|---|---|---|---|
| 4,038,718 A | * | 8/1977 | Reilhac et al. | 292/336.3 |
| 4,497,514 A | * | 2/1985 | Moriya et al. | 292/336.3 |
| 4,653,143 A | * | 3/1987 | Ketelhut et al. | 292/336.3 |
| 4,834,433 A | * | 5/1989 | Keller | 292/336.3 |
| 4,875,726 A | * | 10/1989 | Thau | 292/337 |
| 4,924,582 A | * | 5/1990 | Keller | 29/434 |
| 5,183,302 A | * | 2/1993 | Pelachyk et al. | 292/336.3 |
| 5,263,750 A | * | 11/1993 | Smith et al. | 292/336.3 |
| 5,282,657 A | * | 2/1994 | Clinch et al. | 292/336.3 |
| 5,377,450 A | * | 1/1995 | Varajon | 49/502 |
| 5,413,391 A | * | 5/1995 | Clavin et al. | 292/170 |
| 5,706,554 A | * | 1/1998 | Ruckert et al. | 292/336.3 |
| 5,913,649 A | * | 6/1999 | Tomimatsu et al. | 411/373 |
| 5,943,737 A | * | 8/1999 | Tomimitsu et al. | 16/412 |
| 6,039,366 A | * | 3/2000 | Lewis | 292/352 |
| 6,059,329 A | * | 5/2000 | Spitzley | 292/336.3 |
| 7,104,575 B2 | * | 9/2006 | Kakita | 292/348 |

FOREIGN PATENT DOCUMENTS

| | | |
|---|---|---|
| JP | 02-129559 U | 10/1990 |
| JP | 05-184779 A | 7/1993 |
| JP | 2590693 | 12/1998 |

* cited by examiner

*Primary Examiner* — Thomas A Beach
*Assistant Examiner* — Mark Williams
(74) *Attorney, Agent, or Firm* — Arent Fox LLP

(57) ABSTRACT

In a cover member attaching structure for putting a flat shaped cover member 3 of a synthetic resin in position in a principal part 1, a dummy gate 5 serving as an inlet for resin injection from a submarine gate 4 during molding remains uncut after molding and protrudes from the cover member 3, while the principal part 1 has a portion 6 formed for accommodating the dummy gate 5.

10 Claims, 6 Drawing Sheets

US 8,220,848 B2

COVER MEMBER ATTACHING STRUCTURE

CROSS-REFERENCE TO RELATED APPLICATION

This application claims priority from Japanese Application No. 2003-122308, filed Apr. 25, 2003.

BACKGROUND OF THE INVENTION

This invention relates to a cover member attaching structure.

It is already known that a submarine gate is used for reducing man-hour for cutting off gates for the injection molding of a synthetic resin material. In the event that no port for injection from a submarine gate can be set on a molded product, a dummy gate is set on the product, as described in JP-Y2-2590693.

In the event, however, that a molten resin is introduced into the cavity of a mold from a submarine gate through a dummy gate, the submarine gate drops off upon opening of the mold after molding, but the dummy gate remains as a part of the product and leaves a problem as the work for its removal is required.

SUMMARY OF THE INVENTION

The present invention has been made to overcome the above drawback. It is an object of the present invention to provide a cover member attaching structure which makes it possible to eliminate the man-hour required for cutting off a dummy gate and thereby achieve a reduction of cost. It is another object of the present invention to provide an inside door handle device for a motor vehicle which can be manufactured with an improved efficiency owing to the use of such an attaching structure.

According to the present invention, the above object can be accomplished by providing a cover member attaching structure comprising: a principal part 1; and a cover member with a flat-shape 3, made of a synthetic resin, engaged with the principal part; a dummy gate 5, as an inlet for resin injection from a submarine gate 4 during molding, remaining uncut after molding and protruding from the cover member; and an accommodating portion 6 formed in the principal part 1 for accommodating the dummy gate 5.

According to the invention, the flat-shaped cover member 3 put on the principal part 1 is molded by using a mold employing a submarine gate 4 so that the gate may drop off upon opening of the mold after molding.

In order to employ a submarine gate 4 for molding a flat-shaped cover member 3, it is necessary to form a dummy gate 5 on the rear side of the cover member 3, and a separate job is required if the dummy gate 5 should be cut off from the cover member 3, as stated before.

The present invention has been made by noting that a member of which only the front side is required, such as the cover member 3, can be used with the dummy gate 5 left unremoved without causing any functional problem, since the dummy gate 5 protrudes from the rear side of the product and is not exposed on its front side. Therefore, the present invention makes it possible to eliminate the step of cutting off the gate completely by allowing the principal part 1 to absorb the protruding dimensions of the unremoved dummy gate 5.

BRIEF DESCRIPTION OF THE DRAWINGS

FIGS. 3A to 3C are views showing a cover member, wherein FIG. 3A is a top plan view, FIG. 3B is a front view, and FIG. 3C is a perspective view showing its rear side.

FIGS. 4A to 4C are views showing a process for molding a cover member, wherein FIG. 4A is a view showing the state in which a molten resin has been introduced into a cavity, FIG. 4B is a view showing a mold as opened, and FIG. 4C is a view showing a product as removed from the mold.

FIGS. 5A to 5C are views showing a cover member put in position, wherein FIG. 5A is a sectional view taken along the line VA-VA of FIG. 1, FIG. 5B is a sectional view taken along the line VB-VB of FIG. 1, and FIG. 5C is a sectional view taken along the line VC-VC of FIG. 1.

FIGS. 6A and 6B are views showing a cover member put in position, wherein FIG. 6A is a sectional view taken along the line VIA-VIA of FIG. 1, and FIG. 6B is an enlarged view of part VIB in FIG. 6A.

DESCRIPTION OF THE PREFERRED EMBODIMENT

Figure 1:
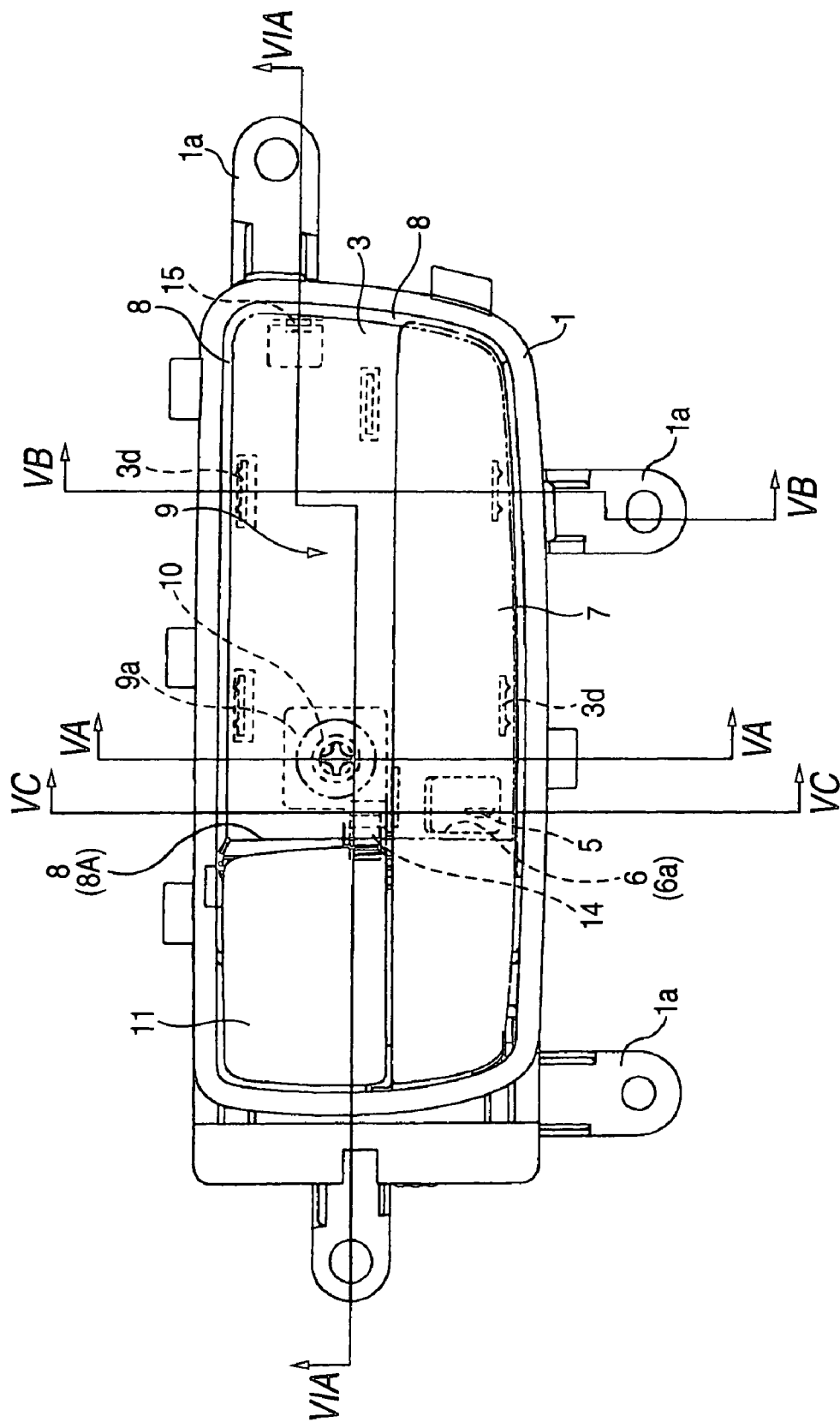
FIG. 1 is a front view of an inside door handle device.
Figure 2:
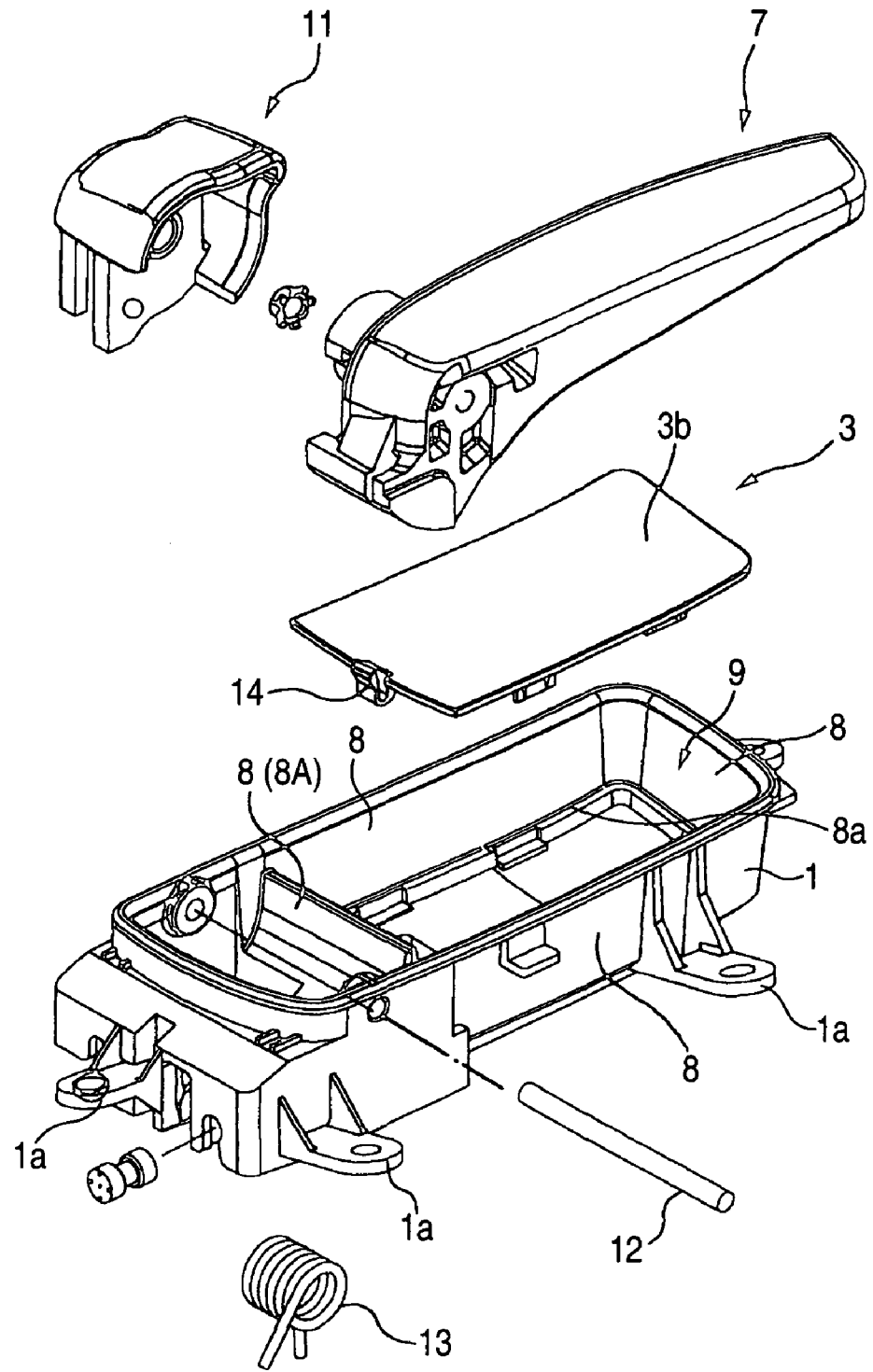
FIG. 2 is an exploded perspective view of FIG. 1.
Figure 3A:
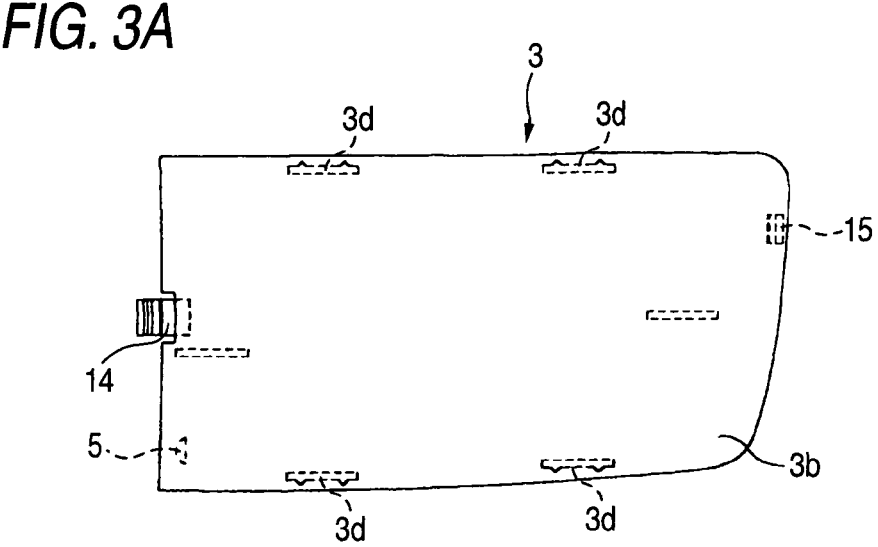
Figure 3B:
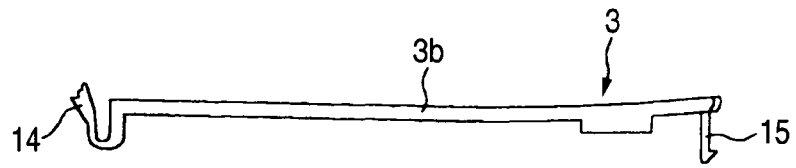
Figure 3C:
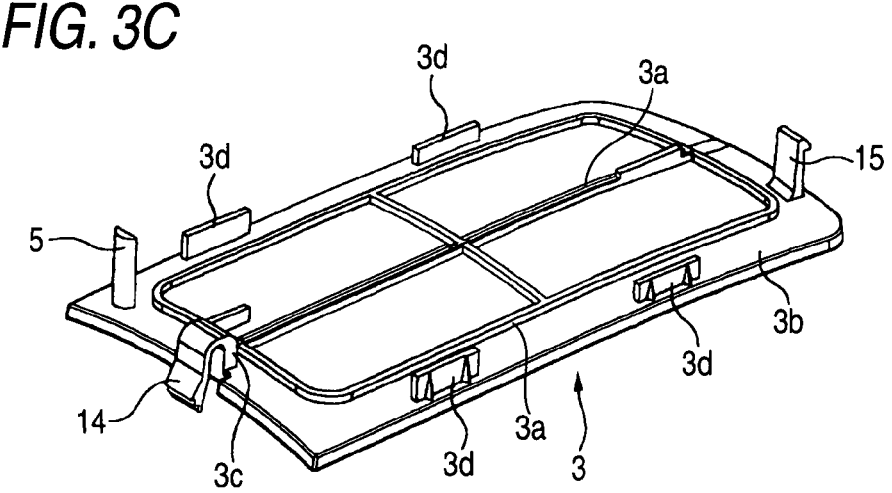

FIGS. 1 and 2 show an inside door handle device for a motor vehicle to which this invention has been applied. The inside door handle device has an operating handle 7 and a lock lever 11 connected to a handle case as a principal part 1 rotatably about a pivot 12 and the rotation of the operating handle 7 against the reaction force of a spring 13 allows a lock device not shown to work for a door opening operation. The lock lever 11 is operable to cancel the door opening operation for the lock device by the operating handle 7 and thereby prevent the opening of the door during the traveling of the vehicle.

The handle case 1 is shaped like a frame and the frame is divided by a cover wall 8A formed at the base ends of the operating handle 7 and the lock lever 11 into a region for accommodating the shaft for the operating handle 7, etc. and the remaining region which defines a hand-operating recess 9 surrounded by an upstanding wall 8 formed by the side walls of the frame and the cover wall 8A.

Figure 5A:
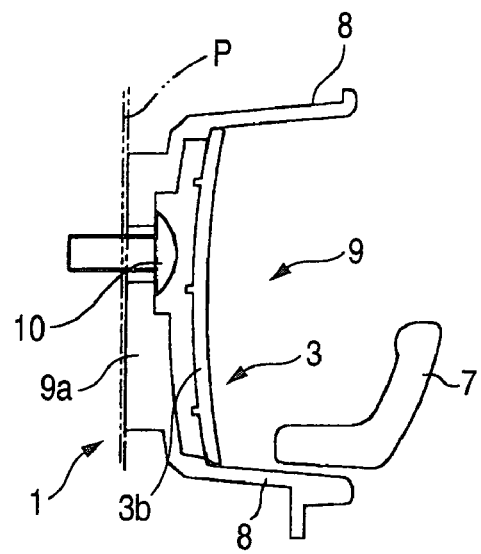

The attachment of the inside door handle device to a door inner panel P is carried out by fixing to, the door panel P attaching lugs 1a protruding outwardly from the handle case 1 with the operating handle 7 and the lock lever 11 connected thereto and an attaching lug 9a formed in a region facing the hand-operating recess 9. A bolt for fixing to the door panel P the attaching lug 9a in the frame with the operating handle 7, etc. attached to the handle case 1 has its head (fixing portion 10) exposed on the surface, and a cover member 3 is put to cover it, as shown in FIG. 5A.

In order to prevent the occurrence of any ornamental incompatibility from the covering of only the head 10 of the bolt, the cover member 3 covers substantially the whole of the bottom of the hand-operating recess 9, is substantially so sized as to form the bottom wall of the hand-operating recess 9 and has a main portion 3b in the form of a plate reinforced by ribs 3a formed on its rear surface, an engaging leg 14 for a release operation and a second engaging portion 15.

Figure 4A:
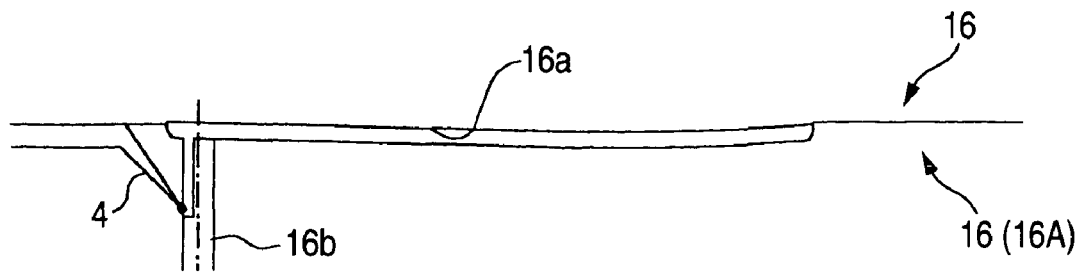

The cover member 3 is manufactured by the injection molding of a synthetic resin and a submarine gate 4 not calling for any work to cut it off is used for injecting the resin into the cavity 16a of a mold 16, as shown in FIG. 4A. A dummy gate 5 is set on the rear side of the main portion 3b for injecting the resin through the submarine gate 4 for the cover member 3 shaped like a sheet and having a small thickness.

According to this embodiment, the dummy gate 5 is formed by cutting away a part of the end portion of an ejector pin 16b situated in a movable mold 16A.

Figure 4B:
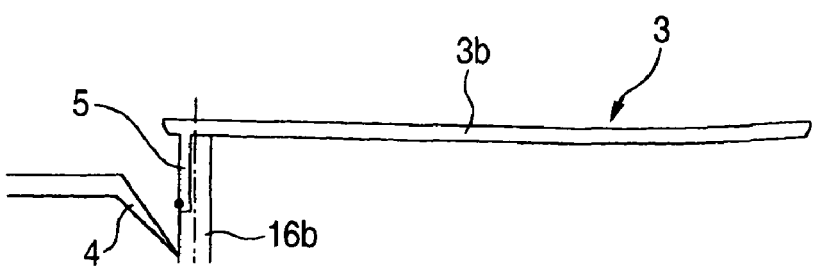

Therefore, according to this embodiment, the opening of the mold after the injection of the molten resin under pressure into its cavity 16a, as shown in FIG. 4A, and the ejection of the product by the ejector pin 16b, as shown in FIG. 4B, result in the cutting of the submarine gate 4 off the dummy gate 5 at their boundary with the opening of the mold, and thereby makes the cutting of the gate unnecessary.

Figure 4C:
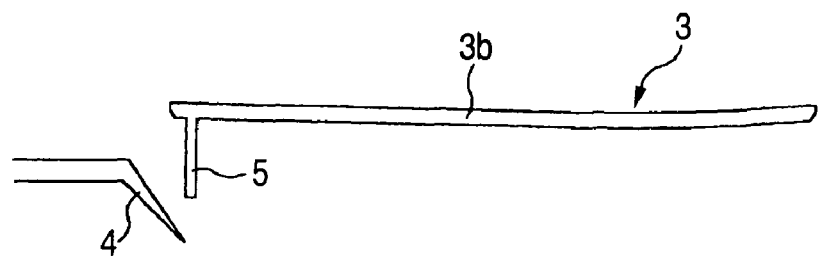

The dummy gate 5 protruding from the rear side of the main portion 3b is not removed, but the product is used as it is, as shown in FIG. 4C, so that the work to cut off the gate may be completely eliminated.

Figure 6A:
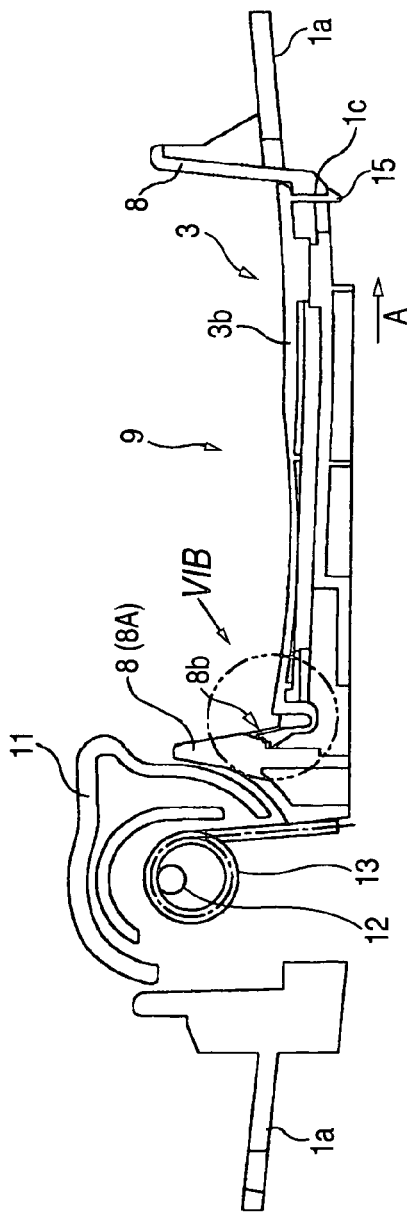
Figure 6B:
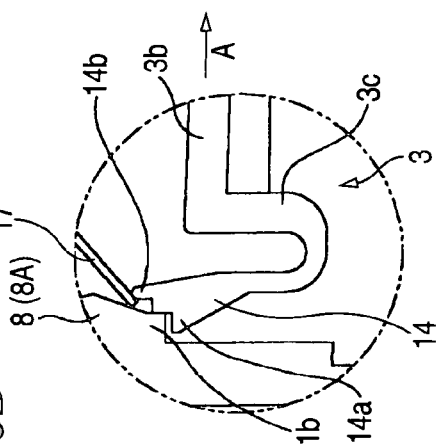

The engaging leg 14 for release operation on the cover member 3 molded as described is formed by folding back upwardly into a U shape a projection 3c protruding on the rear surface of the main portion 3b from the center of one of its short sides, as shown in FIGS. 6A and 6B. A portion 14a engaging an engaging shoulder 1b on the handle case 1, as will be described, is formed at the end of the engaging leg 14 for release operation.

The second engaging portion 15 is formed at the short side opposite the edge where the engaging leg 14 for release operation is formed. The second engaging portion 15 has its end so positioned as not to project beyond the edge of the cover member 3 as viewed in top plan, so that the second engaging portion 15 may not slide in contact with the upstanding wall 8 and scratch it when the cover member 3 is put in position, as will be described later.

Figure 5B:
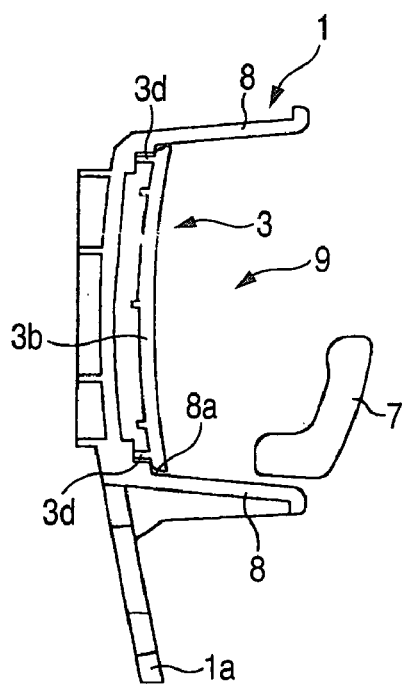
Figure 5C:
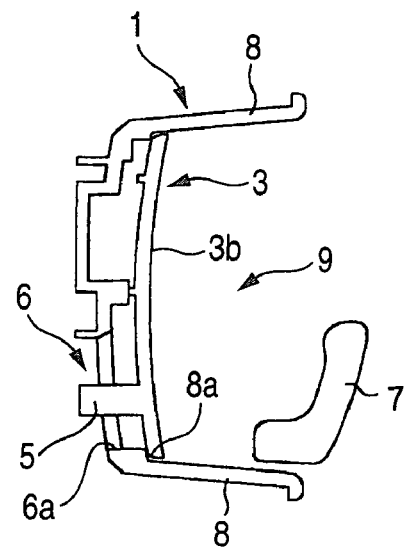

The cover member 3 is put in the handle case in such a way that it is supported on a supporting shoulder 8a formed at the base end of the upstanding wall 8 of the handle case 1, as shown in FIGS. 5A to 5C. The handle case 1 has an opening 6a for the passage of the dummy gate 5 and the thickness of the handle case 1 is utilized to form an accommodating portion 6 therefore, so that the dummy gate 5 may not prevent the cover member from being put in position in the handle case 1.

When the cover member 3 is put in position, the second engaging portion 15 and the engaging portion 14a of the engaging leg 14 for release operation are engaged with the handle case 1 to prevent its detachment. When it is put in position, the engaging leg 14 for release operation is slightly flexed to produce an elastic restoring force which urges the whole cover member 3 toward the second engaging portion 15 as shown by an arrow A in FIGS. 6A and 6B. As a result, the second engaging portion 15 is pressed against an engaging wall 1c on the handle case 1 and cooperates with the sliding contact of positioning lugs 3d formed on the rear surface of the main portion 3b near its edges to hold the cover member 3 against irregular movement, as shown in FIG. 5B.

The removal of the cover member 3 put in position as described can be done easily by inserting a tool 17 having a sharp tip into a gap between a hooking projection 14b formed near the engaging portion 14a and the surface of the upstanding wall 8 and turning the tool 17, as shown in FIG. 6B. According to the mode of embodiment under description, the upstanding wall 8 has a recess 8b accommodating the hooking projection 14b, so that no scratch made by the tool 17 during its insertion into the gap, or during its turning is easily visible to the user.

As is obvious from the foregoing description, this invention makes it possible to eliminate the man-hour for cutting off a dummy gate and thereby reduce the cost of manufacture.

What is claimed is:

1. A cover member attaching structure comprising:
   an operating handle;
   a principal part fixed to a body by a bolt at a bottom portion of the principal, the principal part including a plurality of upstanding walls extending upward from the bottom portion of the principle part;
   a pivot directly fixed on the principal part, wherein the operating handle is rotatable around the pivot;
   an insertable cover member made of a synthetic resin, the insertable cover being inserted within and engaged with the principal part, wherein a head of the bolt along with the entire bottom portion of the principle part is covered by the cover member;
   a recess including a surrounding wall defined by the plurality of upstanding walls, and the recess including a bottom wall defined by the cover member when the cover member is inserted in the principle part, wherein the operating handle is positioned in the recess;
   a protrusion integrally formed on and extending from the cover member; and
   an accommodating portion defined in the principal part for receiving the protrusion therethrough when the cover member is inserted in the principle part,
   wherein the protrusion extends from the cover member in an orthogonal manner relative to a surface of the cover member.

2. The cover member attaching structure according to claim 1, wherein the cover member and the protrusion are made of the same resin material.

3. The cover member attaching structure according to claim 1, wherein the protrusion extends toward principal part.

4. The cover member attaching structure according to claim 1, further comprising:
   an inner trim provided on the body, wherein the principal part is attached to the inner trim and fixed to the body.

5. An inside door handle device for a motor vehicle comprising:
   an operating handle;
   a handle case connected to the operating handle, the handle case including a plurality of upstanding walls, the plurality of upstanding walls extending upward from a bottom portion of the handle case;
   a pivot directly fixed on the handle case, wherein the operating handle is rotatable around the pivot;
   a fixing portion for fixing the handle case to a vehicle body, wherein the fixing portion includes a bolt;
   an insertable cover member inserted and attached to the handle case for covering the fixing portion, wherein a head of the bolt along with the entire bottom portion of the handle case is covered by the cover member;
   a handle-operating recess including a surrounding wall defined by the plurality of upstanding walls, and the recess including a bottom wall defined by the cover member when the cover member is inserted in the handle case, wherein the operating handle is positioned in the handle-operating recess;
   a protrusion integrally formed on and extending from the cover member; and
   an accommodating portion defined in the handle case for receiving the protrusion therethrough when the cover member is inserted in the handle case,
   wherein the protrusion extends from the cover member in an orthogonal manner relative to a surface of the cover member.

6. The inside door handle device according to claim 5, wherein the cover member and the protrusion are made of the same resin material.

7. The inside door handle device according to claim 5, wherein the cover member substantially covers an entire bottom area of the hand-operating recess.

8. The inside door handle device according to claim 5, wherein the protrusion extends toward the handle case.

9. The inside door handle device according to claim 5, wherein the protrusion extends through the hand-opening recess.

10. The inside door handle device according to claim 5, further comprising:

an inner trim provided on the vehicle body, wherein the principal part is attached to the inner trim and fixed to the body.

* * * * *